United States Patent
Sieber et al.

(10) Patent No.: US 7,233,119 B2
(45) Date of Patent: Jun. 19, 2007

(54) METHOD AND CIRCUIT ARRANGEMENT FOR THE SENSORLESS DETERMINATION OF LOAD STATES OF SYNCHRONOUS LINEAR MOTORS

(75) Inventors: Bernd Sieber, Siegsdorf (DE); Günter Oedl, Salzburg (AT)

(73) Assignee: Bruckner Maschinenbau GmbH, Siegsdorf (DE)

( * ) Notice: Subject to any disclaimer, the term of this patent is extended or adjusted under 35 U.S.C. 154(b) by 0 days.

(21) Appl. No.: 10/570,161

(22) PCT Filed: Aug. 26, 2004

(86) PCT No.: PCT/EP2004/009540

§ 371 (c)(1),
(2), (4) Date: Mar. 1, 2006

(87) PCT Pub. No.: WO2005/025046

PCT Pub. Date: Mar. 17, 2005

(65) Prior Publication Data

US 2007/0013329 A1    Jan. 18, 2007

(30) Foreign Application Priority Data

Sep. 5, 2003    (DE)    ............................... 103 41 511

(51) Int. Cl.
*H02P 1/00*    (2006.01)

(52) U.S. Cl. .................. 318/135; 318/38; 318/687; 318/640; 318/696

(58) Field of Classification Search .................. 318/28, 318/135, 640, 687, 696; 310/12, 49 R; 360/69, 360/71
See application file for complete search history.

(56) References Cited

U.S. PATENT DOCUMENTS 3,736,880 A    6/1973    Ross (Continued)

FOREIGN PATENT DOCUMENTS

DE    23 56 679    5/1975

(Continued)

OTHER PUBLICATIONS

International Search Report of PCT/EP2004/009540, mailed Jan. 26, 2005.

(Continued)

*Primary Examiner*—Paul Ip
(74) *Attorney, Agent, or Firm*—Nixon & Vanderhye P.C.

(57) ABSTRACT

The invention relates to a method and to a circuit arrangement used to regulate synchronous linear motors, especially linear drive mechanisms in film drawing systems. The force ($F_{clip}$) between the stationary primary part and the moved secondary part is determined in a sensorless manner from the voltages and currents calculated and measured in a frequency converter in a functional block, in such a manner that the integral is calculated from the active power during a time period ($t_{clip}$) between two pulses (new$_{clip}$) produced by an overriding control and said integral is divided by the active length ($l_{zone}$) of the primary part. Alternatively, the force ($F_{clip}$) can also be determined by summation of the voltages in the f-axis in order to reduce the drop in voltage in relation to the resistance ($R_{str}$) of the branch in the primary part. Voltages and currents are transformed on the primary part by a co-ordinate system related to the secondary part.

18 Claims, 2 Drawing Sheets

U.S. PATENT DOCUMENTS

Figure 1:
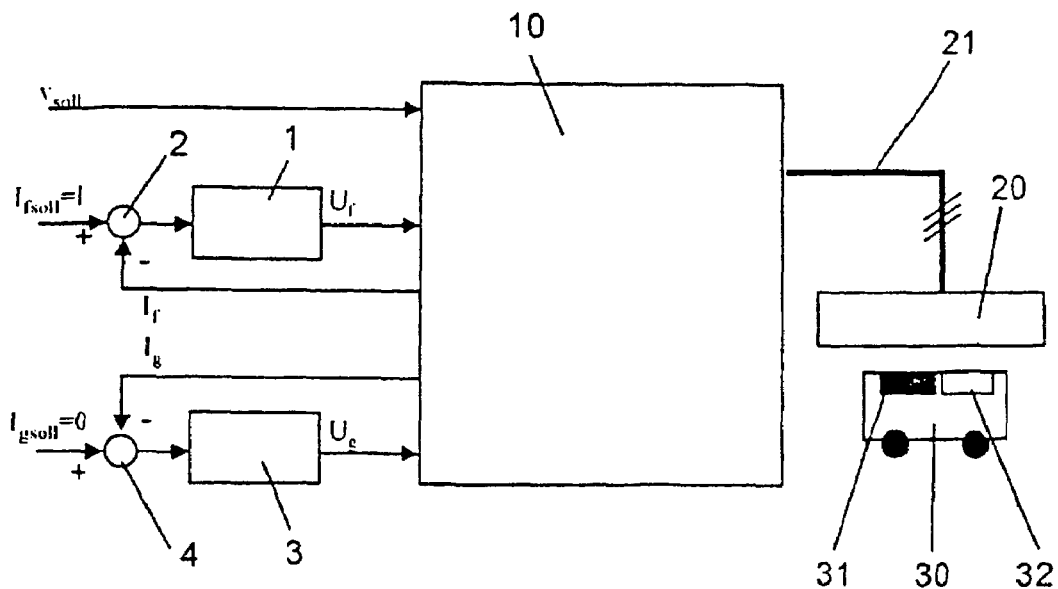

| | | | |
|---|---|---|---|
| 4,303,870 A | | 12/1981 | Nakamura et al. |
| 4,509,001 A | * | 4/1985 | Wakabayashi et al. ...... 318/687 |
| 4,675,582 A | * | 6/1987 | Hommes et al. .............. 318/38 |
| 4,853,602 A | * | 8/1989 | Hommes et al. .............. 318/38 |
| 5,218,490 A | * | 6/1993 | Sakamoto et al. ............ 360/71 |
| 5,416,397 A | * | 5/1995 | Mazzara et al. ............ 318/696 |
| 5,801,462 A | * | 9/1998 | Yagoto et al. ................ 310/12 |

FOREIGN PATENT DOCUMENTS

| | | |
|---|---|---|
| DE | 196 34 449 C 2 | 3/1998 |
| DE | 197 47 412 A 1 | 4/1999 |
| DE | 197 51 375 A 1 | 5/1999 |
| WO | 99/39430 | 8/1999 |
| WO | 00/79675 A1 | 12/2000 |

OTHER PUBLICATIONS

Gu et al., "A Vector Control Scheme for a PM Linear Synchronous Motor in Extended Region", IEEE Transaction on Industry Applications, vol. 39, No. 5, Sep./Oct. 2003.

Corley et al., "Rotor Position and Velocity Estimation for a Permanent Magnet Synchronous Machine at Standstill and High Speeds", IEEE 1996, pp. 36-41.

Vas, Peter "Sensorless Vector and Direct Torque Control," Oxford University Press Inc., New York, New York (1998).

* cited by examiner

METHOD AND CIRCUIT ARRANGEMENT FOR THE SENSORLESS DETERMINATION OF LOAD STATES OF SYNCHRONOUS LINEAR MOTORS

This application is the US national phase of international application PCT/EP2004/009540, filed 26 Aug. 2004, which designated the U.S. and claims priority of DE 103 41 511.4, filed 5 Sep. 2003, the entire contents of each of which are hereby incorporated by reference.

The invention relates to a method for controlling synchronous linear motors, in particular for linear drives in film stretching installations, as claimed in the precharacterizing clause of claims 1 and 2, and to a circuit arrangement for carrying out this method as claimed in the precharacterizing clause of claims 15 and 16.

Synchronous linear motors which are used, for example, for the movement of holders in film stretching installations, must be controlled in such a way that the movement of the secondary part relative to the stationary primary part takes place in a manner which is as accurate, stable and energy-saving as possible. There are particular requirements in this case when the moving secondary part is not always operatively connected to the primary part, but only at times, that is to say when the secondary part is moved beyond the primary part or is moved from an external area into the area of the primary part.

Sensorless control systems for synchronous motors are known from a range of patents and publications. The subject matter and aim are in this case to control the movement and load states on the basis of a predetermined criterion.

In the article "Rotor Position and Velocity Estimation for a Permanent Magnet Synchronous Machine at Standstill and High Speeds" (IEEE 1996 pages 36 to 41), M. J. Corley and R. D. Lorenz describe a method for estimation of the position in a rotating synchronous machine from the measured values of currents by means of an observer structure according to Luenberger. The stator and rotor are in this case always located in the effective area.

In the book "Sensorless Vector and Direct Torque Control" (Oxford University Press 1998), P. Vas provides an overview of the current situation relating to solutions for determination of position in synchronous rotating motors. In this case as well, the stator and rotor are always located in the effective area.

The patent specification WO 99/39430 describes the rotor-oriented control of rotating synchronous motors using the three-dimensional magnetic permeability fluctuations to determine the rotor position. The object in this case is to control the motor without any separate sensors for detection of the rotor position. The permeability fluctuations are, however, small in comparison to the effects of the back e.m.f. from the rotor.

The object of patent specification WO 00/79675 is to identify a load on transformer circuit arrangements. In this case, the idea of load identification is applied only in stationary arrangements.

The patent specification DE 19747412 A1 describes a method for synchronization of electric motor force and current space vectors for synchronous drives, which are controlled on a digitally field-oriented basis, with linear motors. In this case, the correct association between the two variables mentioned is determined at rest and with the assistance of a position sensor. The method is not suitable in the event of loss of the detected reference position.

Patent specification DE 19751375 A1 describes a method for reconstruction of load forces and accelerations in electrical drives for use in a closed rotation-speed or position control loop. The forces and/or torques reconstructed with a Luenberger observer are applied in a control loop for position, force or torque control.

DE 19634449 C2 describes a control device having a large number of converters, which are driven via it, in order to provide a linear drive for a large number of holders in film stretching installations. A large number of sections which can be driven individually from one winding section of linear motors can be driven by this control device in such a way that it is possible to separately access a secondary part which is located in one section. The resultant magnetomotive wave of the primary part of the linear motors follows the profile of the phase angle (which is predetermined by the control device) over time, and thus predetermines the speed. The converters feed in currents at constant amplitudes in accordance with the preset. If the flux is constant, the maximum effective force is determined by the current amplitude over time.

The known sensorless control arrangements use various approaches to determine the movement states solely from the currents and voltages without any further separate sensors. In all of the known arrangements, a primary part which is generally fed with three-phase current and a secondary part with electrical or permanent-magnet excitation always interacts in such a way that a force can be produced between them.

This has the disadvantage that, in the case of drive systems with a large number of moving secondary parts which are intended to follow predetermined movement profiles independently of one another, secondary parts are also underneath the primary parts only at times. When a secondary part enters a primary part, the control arrangements then have to detect the movement states very quickly, because of the short times for which they remain in the primary part. The known arrangements cannot achieve this.

Furthermore, if there are a plurality of separately fed primary parts located in the direction of travel, with different lengths as well, the feeding converters once again have to produce at least the correct phase angle of the currents and/or their magnitude and/or the speed of the resultant current wave for the next secondary part to enter, after one secondary part has left.

In known controlled synchronous linear motors which are fed with a constant current from a converter, the current regulator can very quickly regulate out the differences in the impedances and voltages by the presence or absence of the secondary part. In the case of arrangements such as these, the load angle is changed by the external forces acting on the secondary parts in accordance with a sine function of the force against the load angle. In order to maintain sufficient stability against the peak value of the force being exceeded or, in other words, a load angle of more than ±90°, the applied current is set at a sufficiently high level as a precaution. When the flux in the secondary part is constant, the current at the same time also represents a measure of the peak force.

An arrangement such as this has the disadvantages:
that no information whatsoever is available about the actual load state, so that the constant current is fed in without taking into account the actual load state,
that a high current must be fed in in order to maintain stability, so that the losses in the primary parts are large owing to the square relationship with the current, that the steady-state stability limit can be exceeded at a load angle of ±90° if the external load is too large, and that the dynamic stability limit can be exceeded at a load angle of ±180° if the external load is too large and the secondary parts then either come to rest or change their position by at least more than ±180°.

The invention is thus based on the object of providing a method of the type mentioned initially, by means of which the way in which synchronous linear motors are driven can be controlled in a manner which is as accurate, stable and energy-saving as possible, in particular even when the secondary part is located in the effective area of the primary part only at times. A further aim is to provide a circuit arrangement for carrying out this method.

According to the invention, this object is achieved by the features of claims 1 and 2, as well as 15 and 16, respectively. Advantageous embodiments of the invention are described in the further claims.

In a first alternative of the method according to the invention, the force which acts between the primary part and the secondary part is determined from the currents and voltages measured or calculated in the converter, in that the integral is calculated from the real power over a time between two pulses which are produced by a higher-level control system, and this integral is divided by the effective length of the primary part. In this case, the current on the f-axis is regulated at a predetermined value and the current on the g-axis is regulated at zero.

In the second alternative, the object is achieved by a method in which the force which acts between the primary part and the secondary part is determined from the currents and voltages measured or calculated in the converter, in that the sum of the voltages on the f-axis is calculated minus the voltage drop across the resistance of the winding section in the primary part during the time between two pulses which are produced by a higher-level control system, and this sum is multiplied by the current on the f-axis, the time interval and the reciprocal of the length of the primary part. In this case, the current on the f-axis is regulated at a predetermined value, and the current on the g-axis is regulated at zero.

One characteristic feature of the method according to the invention is that the actual force acting between the primary part and the secondary part is determined without the use of sensors from currents and voltages which are described using a two-axis representation in a coordinate system which is oriented to the secondary part, and are transformed to the stationary primary part. The force is in this case calculated either by means of the integral from the real power or by means of the sum of the voltages on the f-axis over a predetermined time, which is between two pulses produced by a higher-level control system. Since the current on the f-axis is regulated at a predetermined value and the current on the g-axis is regulated at zero, the force can be determined more easily.

The method according to the invention allows the following advantages to be achieved without any additional elements either outside the converter or within the converter, by means of an appropriate configuration:

the mean force on a secondary part can be determined for one run through a primary part, if there are a plurality of separately fed primary parts through which a secondary part passes, a force profile can be determined in this way and allows the actually occurring loads to be determined, if the determined force is higher than that expected, then the current can be increased as a stability margin in any desired primary parts which can be selected by the control system presetting new nominal values for the current, the mean load angle can be determined for one run through a primary part, the current in the secondary parts can be reduced in accordance with the forces actually required in the secondary parts, thus making it possible to save energy, it is possible to detect any occurrence of the stability limit (Pull Out) being exceeded before the primary part under consideration, this information can likewise be used to increase the currents in selected primary parts as a stability margin, the knowledge from data stores and knowledge stores can be used, and self-learning systems are possible.

The reactive force is advantageously calculated by calculating the sum of the voltages on the g-axis minus the inductive voltage drop across the inductances in the primary part during the time between the two pulses which are produced by the higher-level control system, and by multiplying the sum obtained in this way by the current on the f axis, the time interval and the reciprocal of the effective length of the primary part. The load angle can be determined from the reactive force determined in this way by calculating the tangent of the quotient of the force to the reactive force. This makes it possible to determine the margin from the steady-state or dynamic stability limit so that, if necessary, energy can be saved by reducing the constant current that is fed in, or the constant current can be increased in order to prevent stability limits from being exceeded.

In a first alternative of the circuit arrangement for carrying out the method according to the invention, a computation block is provided, in which currents and voltages which relate to the secondary part are transformed to the primary part, with the transformed currents and voltages being described in a two-axis coordinate system with a real f-axis and an imaginary g-axis. The computation block also contains a device for calculation of the force acting between the primary part and the secondary part from the currents and voltages as calculated or as measured in the converter, by formation of the integral of the real power over a time between two pulses which are produced by a higher-level control system, and by division of the integral formed in this way by the effective length of the primary part. A device is also provided which regulates the current on the f-axis at a predetermined value, and regulates the current on the g-axis at zero.

According to a second alternative of the circuit arrangement according to the invention, the computation block contains a device for calculation of the force acting between the primary part and the secondary part from the currents and voltages as calculated or as measured in the converter, by formation of the sum of the voltages on the f-axis minus the voltage drop across the resistance of the winding section in the primary part during the time between two pulses produced by a higher-level control system, and by multiplication of the sum formed in this way by the current on the f axis, the time interval and the reciprocal of the effective length of the primary part. A device is also provided in this case which regulates the current on the f-axis at a predetermined value, and regulates the current on the g-axis at zero.

The computation block may be arranged in the converter or outside the converter.

Figure 2:
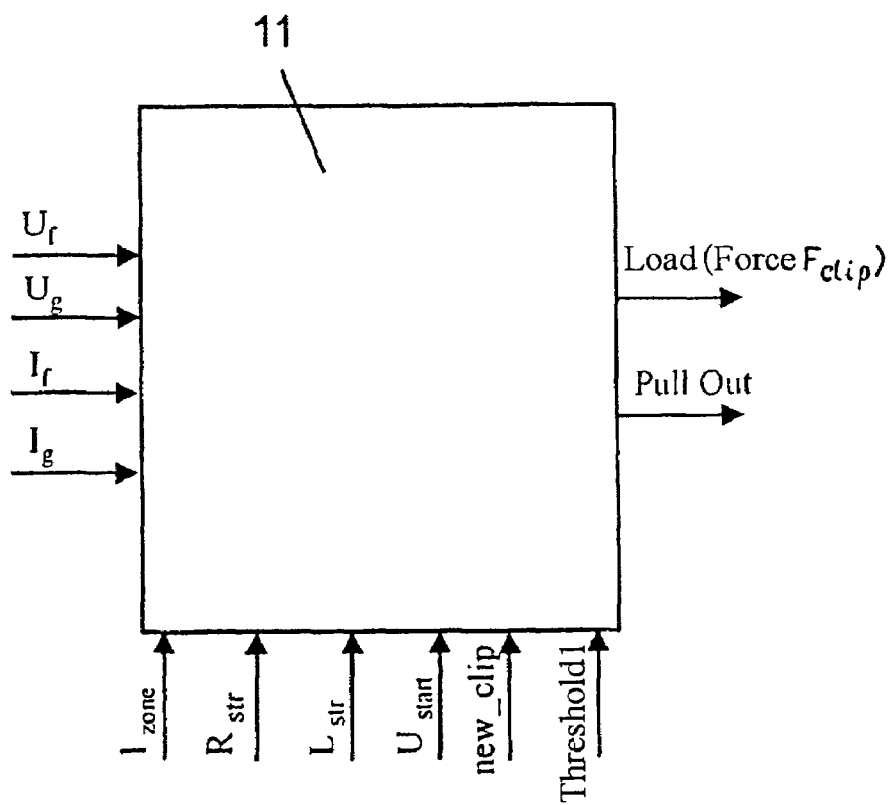
Figure 3:
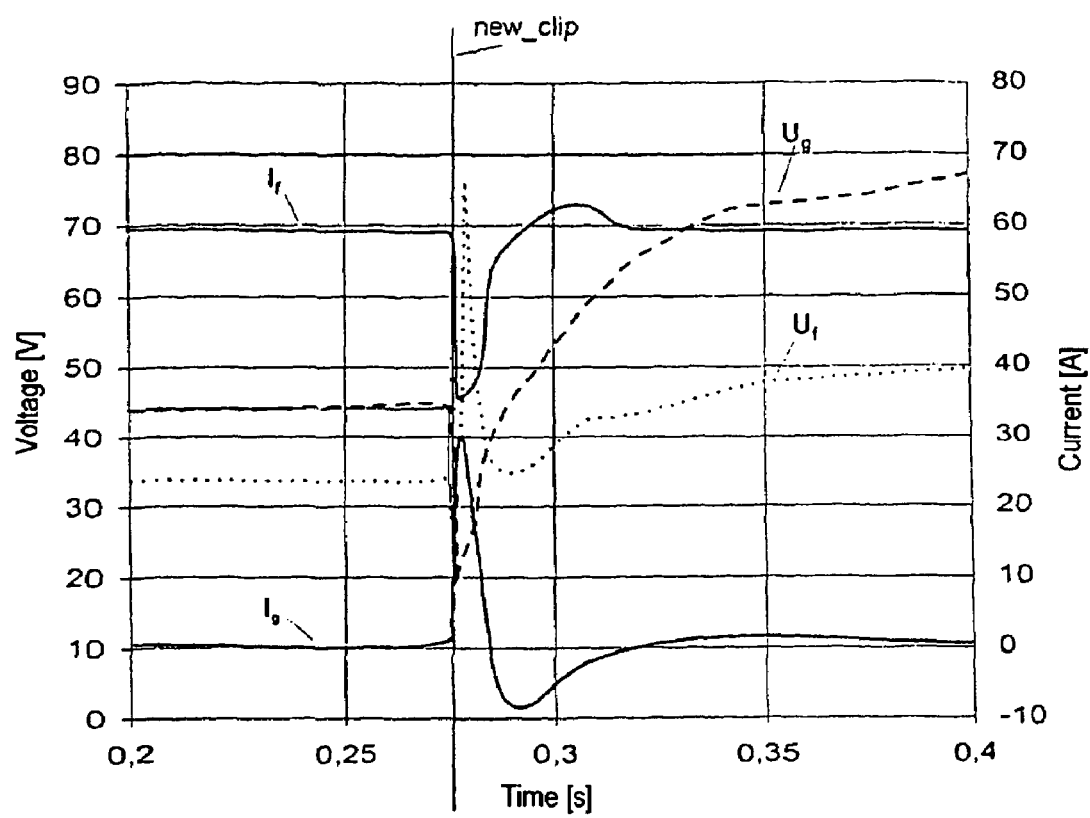

The invention will be explained in more detail by way of example in the following text with reference to the drawings, in which:

FIG. 1 shows a schematic illustration of the circuit arrangement according to the invention with current regulators, a converter and a linear motor, FIG. 2 shows a schematic illustration for the calculation of the load states, and FIG. 3 shows a diagram in order to illustrate the basic behavior during commutation.

The general principle of the method according to the invention will first of all be explained in more detail.

The currents and voltages for a synchronous linear motor can be described using a coordinate system which is related to the moving secondary part of the linear motor and is transformed to the stator. The real f-axis and the imaginary g-axis of the coordinate system move with the secondary part. There is an unknown load angle b between the stator system and the secondary part, and this forms the variable in the transformation relationship with respect to the stator.

The power levels are then obtained from the transformed currents and voltages in said stator coordinate system as components for the real power:

$$P_w = U_f I_f + U_g I_g \qquad \text{Equation 1}$$

and for the wattless component:

$$P_b = U_g I_f - U_f I_g \qquad \text{Equation 2}$$

Where:
$P_w$ Real power
$P_b$ Wattless component
$U_f$ Measured voltage on the f-axis
$U_g$ Measured voltage on the g-axis
$I_f$ Measured current on the f-axis
$I_g$ Measured current on the g-axis In addition, a higher-level control system predetermines the parameter new_clip as a start pulse for the calculation and the effective length $l_{zone}$ of the primary part for the section to be fed. The time between two pulses new_clip is $t_{clip}$. The pulses new_clip thus predetermine an internal clock. The time $t_{clip}$ may—but need not—correspond to the time for which a secondary part is located in the area of the primary part.

In the power balance, the real power within the time $t_{clip}$ is converted to the losses in the primary part and to the power transmitted to the secondary part. Ignoring the iron losses in the primary part, only the copper losses $V_{cu}$ are significant. With the nominal value of the speed of the secondary part $v_{clip}$, which to a good approximation corresponds to the mean value of the speed of the secondary part, the effective zone length $l_{zone}$ of a primary part is:

$$l_{zone} = v_{clip} \cdot t_{zone} \qquad \text{Equation 3}$$

where $t_{zone}$ is the true time for which a secondary part is located in the effective area of the primary part.

The force $F_{clip}$ on a secondary part can be calculated easily from $$F_{clip} = \frac{1}{n_{clip} \cdot l_{zone}} \cdot \int_o^{t_{clip}} (P_w(t) - V_{cu}(t)) dt \qquad \text{Equation 4}$$

The number of secondary parts $n_{clip}$ in this case takes into account the situation in which a plurality of secondary parts are opposite a corresponding number of primary parts which are fed in parallel, that is to say they are electrically connected in parallel. The notation of the variables as a function of time t underscores the fact that the variables can change their value while a secondary part is running under a primary part (or $n_{clip-}$ times the number).

The instantaneous force while a secondary part is located under a primary part is calculated from the measurable currents and voltages from Equation 1 by using the measurable variables with their time-dependent values, and by dividing them by the instantaneous speed.

If the current components are controlled in such a way that the current $I_g$ is regulated at zero and the current $I_f$ is regulated at a predetermined value, the calculation can be considerably simplified. The equations for the real power are then simplified to:

$$P_w = U_f I_f \qquad \text{Equation 5}$$

and for the wattless component $$P_b = U_g I_f \qquad \text{Equation 6.}$$

The force can be calculated from Equation 4 in a simplified form with the simplification in Equation 5 by addition of the voltage values $U_g$ minus the voltage drop in each case at the end of each time interval $\Delta t$ of the digital regulator over the entire time $t_{clip}$, followed by multiplication by the time interval itself and the current $I_f$. After division by the length of the primary part $1_{zone}$ and the number $n_{clip}$ of secondary parts, this results in the average force $F_{clip}$ acting during the time $t_{clip}$ from Equation 7.

$$F_{clip} = \frac{I_f \cdot \Delta t}{n_{clip} \cdot l_{zone}} \cdot \sum_{t=0}^{t_{chp}} (U_g - R_{str} \cdot I_f) \qquad \text{Equation 7}$$

In this case, $R_{str}$ denotes the resistance of one winding section of the linear motor, transformed to the two-axis system.

The phase angles of the magnetomotive force fundamental wave when the secondary part enters the primary part and when it emerges from the primary part may differ. The initial phase angle must be set again for the next secondary part entering the primary part. During this change in the phase angle of the magnetomotive force wave, which is also referred to as commutation, the stated conditions $I_f$=preset value and $I_g$=0 may no longer be satisfied. FIG. 3 shows the basic behavior of the currents and voltages after a pulse new_clip which determines the start of the commutation process, for the situation in which a phase difference α has occurred.

A better match of the calculation with the actual force to a moving secondary part is obtained by means of a correction in the calculation of the force $F_{clip}$ in order to take this behavior into account. The correction either comprises a table which is stored in a computation block and has correction values as a function of the nominal current and the sudden phase change in the currents on switching, or an estimate is made on the basis of the known variables. In the simplest form, an estimate can be made using Equation 8.

$$U_{start} = \frac{I_f \cdot L_{str}}{\Delta t} \cdot (1 - \cos(\alpha)) \qquad \text{Equation 8}$$

In this case, $L_{str}$ denotes the inductance of one winding section of the linear motor, transformed to the two-axis system. The voltage $U_{start}$ determined in this way is used as a negative initial value for the addition process in Equation 7.

The wattless component according to Equation 6 as stated above increases with the magnitude of the current $I_f$. A further variable, in this case referred to as the reactive force, can also be calculated from the wattless component, using the simplifications already mentioned, for calculation of the real power. $U_g$ is then used instead of the voltage $U_f$, and the inductance $R_{str}$ multiplied by the mean angular velocity is then used instead of the resistance $R_{str}$.

The tangent from the quotient of the force to the reactive force results in the load angle.

The secondary parts can pull out of the current wave before the primary part under consideration. The secondary part is then not located under the primary part, and exerts no interaction, at the expected time $t_{clip}$. The squares of the sums of the voltages $U_f$ reduced by the voltage drops across the resistance and of the voltages $U_g$ reduced by the voltage drops across the inductances are compared, after addition, with a threshold value in a comparator. If the threshold value is undershot, the comparator emits a message about the pull out, for example "Pull Out".

If the calculated force is less than a predetermined threshold, then a comparator determines this and emits a message.

A further criterion for a pull out is a predetermined threshold for the calculated reactive force being exceeded.

The circuit arrangement according to the invention will now be described in more detail with reference to FIG. 1.

FIG. 1 shows a converter 10 which contains a model for calculation of the current flow for a primary part 20, a control element for the current flow, and a current measurement device. The model calculates the current values for an output 21 using a coordinate system which is related to a secondary part 30, with the two axes, the longitudinal axis and the quadrature axis, corresponding to the known two-axis theory, and then transforms these values to a three-phase system. The nominal values for the currents $I_f$, $I_g$ and the angle of the resultant space vector of the model are calculated by the converter 10 from the nominal values for the voltages on the longitudinal axis $U_f$ and on the quadrature axis $U_g$ using a coordinate system which is related to the primary part 20, after transformation to the coordinate system of the secondary part 30. Furthermore, the speed $v_{nom}$ of the secondary part 30 is predetermined. For this purpose, the computation model contains the reactances and resistances of the primary part 20 as parameters. The computation model determines the actual values of the currents on the f-axis $I_f$ and on the g-axis $I_g$ from the measured values in the three-phase system and, after transformation, passes them to adders 2 and 4 using the two-axis system of the primary part 20. Two current regulators for the longitudinal axis and for the quadrature axis, which are annotated 1 and 3 respectively, receive the difference from the adders 2 and 4. The voltages on the f-axis $U_f$ and on the g-axis $U_g$ are then produced at the outputs of the current regulators 1, 3 as nominal values for the converter block 10.

The back e.m.f. which is induced in the primary part 20 during movement of the secondary part 30 with two magnets 31, 32 of different polarity leads to a disturbance to the equilibrium in the current regulators 1, 3, and this is regulated out in the current control loop. In this case, the actual values of the current on both axes change at least at times as the secondary part 30 enters and emerges from the primary part 20. The voltages $U_f$ and $U_g$ on both axes likewise change, but remain largely constant while the secondary part 30 is located there, apart from control oscillations and the transitions from one primary part 20 to the other.

FIG. 2 shows a computation block 11. The calculation of the load variables from the measurement variables $U_f$, $U_g$, $I_f$ and $I_g$ in FIG. 1 is carried out in the computation block 11, which may be a part of the converter 10. In this case, the parameter new_clip is additionally predetermined as a pulse for the start of the calculation, and the effective length of the primary part $l_{zone}$ is predetermined by the higher-level control system for the section to be fed. The time that passes between two pulses new_clip is $t_{clip}$.

The motor parameters $R_{str}$ (resistance of the winding section in the linear motor) and $L_{str}$ (inductance of the winding section in the linear motor) are likewise predetermined as transformed variables in the two-axis system. A comparator, which is not illustrated, compares the internally calculated variables with a threshold value "threshold 1", and emits a "Pull Out" message if this threshold value is undershot.

The results of the computation block 11 are produced at the output, for further evaluation, immediately after the pulse new_clip.

The invention claimed is:

1. A method for controlling synchronous linear motors, for linear drives in film stretching installations, having at least one stationary primary part and at least one secondary part which can be moved along the primary part and is located in the effective area of the primary part at least at times, and having a converter which is associated with the primary part, constant predetermined currents being used for control purposes, currents and voltages being described with the aid of a two-axis coordinate system which is related to the secondary part, is transformed to the primary part and has a real f-axis and an imaginary g-axis after transformation, the method comprising:

calculating and/or measuring currents and voltages in the converter, determining the force ($F_{clip}$) which acts between the primary part and the secondary part from the currents and voltages measured or calculated in the converter, including calculating the integral from the real power over a time ($t_{clip}$) between two pulses (new_clip) which are produced by a higher-level control system, and dividing said integral the effective length ($l_{zone}$) of the primary part, and regulating the current ($I_f$) on the f-axis at a predetermined value and regulating the current ($I_g$) on the g-axis at zero.

2. The method as claimed in claim 1, further including calculating the reactive force by calculating the sum of the voltages ($U_g$) on the g-axis minus the inductive voltage drop across the inductances in the primary part during the time ($t_{clip}$) between the two pulses (new_clip) which are produced by the higher-level control system, and multiplying the sum obtained by the current ($I_f$) on the f axis, the time interval ($\Delta t$) and the reciprocal of the effective length ($l_{zone}$) of the primary part.

3. The method as claimed in claim 2, further including calculating the load angle from the tangent of the quotient of the force ($F_{clip}$) to the reactive force.

4. The method as claimed in claim 2, further including comparing the sum of the squares of the force ($F_{clip}$) and of the reactive force with a predetermined threshold value (threshold 1), and emitting a (Pull Out) message if the sum formed in this way is less than the threshold value (threshold 1).

5. The method as claimed in claim 4, further including emitting the (Pull Out) message at the end of the time in which the secondary part is located in the effective area of the primary part.

6. The method as claimed in claim 4, wherein when the (Pull Out) message is present, higher current values ($I_f$) are predetermined on the f axis by the higher-level control system for the converter.

7. The method as claimed in claim 4, further including compensating for the influence of the temperature of the resistance ($R_{str}$) by measuring the winding temperature and by predetermining corrected resistances as a function of the measured winding temperature.

8. The method as claimed in claim 2, further including indicating or making available for further processing the calculated reactive force at the end of the time in which the secondary part is located in the effective area of the primary part.

9. The method as claimed in claim 1, further including indicating or making available for further processing the calculated force ($F_{clip}$) at the end of the time in which the secondary part is located in the effective area of the primary part.

10. The method as claimed in claim 1, further including correcting the calculated force ($F_{clip}$) by subtraction of a tabulated value as a function of the magnitude of the current ($I_f$) on the f axis and the phase difference ($\alpha$) between the currents before and after commutation.

11. The method as claimed in claim 1, further including comparing the calculated force ($F_{clip}$) with a preset value, with the nominal values of the current ($I_f$) on the f-axis in the primary part or in selected primary parts being increased if this preset value is exceeded.

12. A method for controlling synchronous linear motors, for linear drives in film stretching installations, having at least one stationary primary part and at least one secondary part which can be moved along the primary part and is located in the effective area of the primary part at least at times, and having a converter which is associated with the primary part, constant predetermined currents being used for control purposes, currents and voltages being described with the aid of a two-axis coordinate system which is related to the secondary part, is transformed to the primary part and has a real f-axis and an imaginary g-axis after the transformation, the method comprising:
   measuring and/or calculating currents and voltages in the converter,
   determining the force ($F_{clip}$) which acts between the primary part and the secondary part from the currents and voltages measured or calculated in the converter, including calculating the sum of the voltages ($U_f$) on the f-axis minus the voltage drop ($R_{str} \cdot I_f$) across the resistance ($R_{str}$) of the winding section in the primary part during the time ($t_{clip}$) between two pulses (new_clip) which are produced by a higher-level control system, and multiplying the sum by the current ($I_f$) on the f-axis, the time interval ($\Delta t$) and the reciprocal of the length ($l_{zone}$) of the primary part, and
   regulating the current ($I_f$) on the f-axis at a predetermined value, and regulating the current ($I_g$) on the g-axis at zero.

13. The method as claimed in claim 12, further including correcting the calculated force ($F_{clip}$) by selection of a negative initial voltage value ($U_{start}$) for the sum calculation from a table as a function of the magnitude of the current ($I_f$) on the f-axis and the phase difference (a) between the currents before and after commutation.

14. The method as claimed in claim 12, further including correcting the calculated force ($F_{clip}$) by means of a negative estimated initial voltage value ($U_{start}$) for the sum calculation.

15. A circuit arrangement for controlling synchronous linear motors for linear drives in film stretching installations, comprising
   at least one stationary primary part,
   at least one secondary part which can be moved along the primary part and is located in the effective area of the primary part at least at times,
   a converter which is associated with the primary part,
   a computation block that carries out a transformation of currents and voltages described in a two-axis coordinate system related to the secondary part to the primary part using a real f-axis and an imaginary g-axis,
   the computation block comprising a device for calculation of the force ($F_{clip}$) acting between the primary part and the secondary part from the currents and voltages as calculated or as measured in the converter, by formation of the integral of the real power over a time ($t_{clip}$) between two pulses (new_clip) which are produced by a higher-level control system, and by division of the integral formed in this way by the effective length ($l_{zone}$) of the primary part, and
   a regulator which regulates the current ($I_f$) on the f-axis at a predetermined value, and regulates the current ($I_g$) on the g-axis at zero.

16. The circuit arrangement as claimed in claim 15, wherein the computation block is arranged in the converter.

17. The circuit arrangement as claimed in claim 15, wherein the computation block is arranged outside the converter.

18. A circuit arrangement for controlling synchronous linear motors for linear drives in film stretching installations comprising:
   at least one stationary primary part,
   at least one secondary part which can be moved along the primary part and is located in the effective area of the primary part at least at times,
   a converter which is associated with the primary part,
   a computation block which transforms currents and voltages described in a two-axis coordinate system related to the secondary part to the primary part using a real f-axis and an imaginary g-axis,
   the computation block comprising a device for calculation of the force ($F_{clip}$) acting between the primary part and the secondary part from the currents and voltages as calculated or as measured in the converter, by formation of the sum of the voltages ($U_f$) on the f-axis minus the voltage drop across the resistance ($R_{str}$) of the winding section in the primary part during the time ($t_{clip}$) between two pulses (new_clip) produced by a higher-level control system, and by multiplication of the sum formed in this way by the current ($I_f$) on the f axis, the time interval ($\Delta t$) and the reciprocal of the effective length ($l_{zone}$) of the primary part, and
   a regulator that regulates the current ($I_f$) on the f-axis at a predetermined value, and regulates the current ($I_g$) on the g-axis at zero.

* * * * *